United States Patent
Frank et al.

(10) Patent No.: US 7,050,107 B1
(45) Date of Patent: May 23, 2006

(54) INTERFACE DEVICE FOR EXTENDING CAMCORDER USE OVER THE ELECTROMAGNETIC SPECTRUM

(75) Inventors: Jeffrey D. Frank, Santa Barbara, CA (US); Jeffrey Lynn Heath, Santa Barbara, CA (US); Eugene Timothy Fitzgibbons, Goleta, CA (US)

(73) Assignee: Indigo Systems Corporation, Goleta, CA (US)

( * ) Notice: Subject to any disclaimer, the term of this patent is extended or adjusted under 35 U.S.C. 154(b) by 738 days.

(21) Appl. No.: 09/905,006

(22) Filed: Jul. 13, 2001

(51) Int. Cl.
*H04N 5/225* (2006.01)

(52) U.S. Cl. ..................... 348/375; 348/372

(58) Field of Classification Search ............ 348/372, 348/373, 374, 375, 376, 143, 144, 148, 211.1; 396/325, 329; 386/117; 358/906, 909.1
See application file for complete search history.

(56) References Cited

U.S. PATENT DOCUMENTS 5,589,901 A * 12/1996 Means ..................... 396/12
5,717,460 A * 2/1998 Tsuruta et al. ............. 348/372
5,801,774 A * 9/1998 Seo .......................... 348/375
6,587,152 B1 * 7/2003 Sharp et al. ............... 348/373
6,774,935 B1 * 8/2004 Morimoto et al. ....... 348/211.5
6,864,911 B1 * 3/2005 Zhang et al. ............. 348/211.1

FOREIGN PATENT DOCUMENTS

DE 3415982 * 10/1985
JP 06-301096 * 10/1994

* cited by examiner

*Primary Examiner*—David Ometz
*Assistant Examiner*—Luong T. Nguyen
(74) *Attorney, Agent, or Firm*—MacPherson Kwok Chen & Heid LLP; Greg J. Michelson (57) ABSTRACT

An interface device connects a camcorder to a camera operating in the non-visible electromagnetic spectrum to form a portable unitary system. The interface device provides a mechanical connection between the camcorder and the camera. A video cable carries video image data from the camera to the camcorder. A control connection additionally may be provided between the camcorder and the camera through the interface device, to allow the camera to be controlled through controls on the camcorder itself. A power connection may be provided between the camcorder and the camera through the interface device, to allow the camera to draw power from the camcorder.

21 Claims, 9 Drawing Sheets

SECTION A-A
FIG. 7C

SECTION B-B
FIG. 7E

SECTION A-A
FIG. 8B

INTERFACE DEVICE FOR EXTENDING CAMCORDER USE OVER THE ELECTROMAGNETIC SPECTRUM

FIELD OF THE INVENTION

This invention relates to photography, and more particularly to video photography in the non-visible portion of the electromagnetic spectrum.

BACKGROUND

Newly-emerging detector technologies enable the extension of visual perception to wavelengths of the electromagnetic spectrum that cannot be seen by the unaided human eye. These technologies involve the conversion of non-visible photons to electronic signals, which in turn are transformed into black and white or pseudo-colored visible images that are presented to a human observer.

Several portable video camera units for detecting infrared wavelengths of the electromagnetic spectrum are commercially available. Such products include the Milcam from Inframetrics, the Model TVS-600 from Avio, and the Model 545 from Flir Systems. The shortcomings of these cameras are exemplary of the general shortcomings of cameras that operate in the non-visible portion of the electromagnetic spectrum. While these cameras include infrared sensors for detecting infrared photons, some form of display for presenting a video image to an operator, and a user interface allowing a user to control the functioning of the camera, none of these cameras integrates a real-time video image recording capability. In order to record video images from these cameras, an external video cassette recorder must be connected to these cameras via a cable in order to record standard NTSC or PAL video to a video tape. The combination of one of such cameras and a video cassette recorder is bulky and unwieldy, and is inconvenient to use.

In the visible portion of the electromagnetic spectrum, video camcorders are well-known consumer products for capturing moving images and recording those moving images on a storage medium such as a tape. Camcorders combine video imaging and recording functions in a single lightweight and portable unit. Such camcorders are typically ergonomically designed for ease of operation and transport.

SUMMARY

An interface device connects a camcorder to a camera operating in the non-visible electromagnetic spectrum to form a unitary portable system.

In one aspect of the invention, an interface device mechanically connects a camcorder to a camera that captures video images in the non-visible electromagnetic spectrum, forming a portable system. In this way, the camera and camcorder are connected securely, such that an operator can easily transport and utilize the portable system formed by the combination of the camera and camcorder.

In another aspect of the invention, a data connection is provided between the camcorder and the camera, where that connection is performed through or separately from the interface device. This data connection is provided in addition to the mechanical connection provided by the interface device. Video image data is transmitted from the camera to the camcorder through the data connection, such that video image data can be recorded on media associated with the camcorder.

In another aspect of the invention, a control connection is provided between the camcorder and the camera, where that connection is performed through or separately from the interface device. The control connection allows the camera to be controlled through controls on the camcorder itself. In this way, the operator can utilize the familiar, user-friendly features of the camcorder to operate the attached camera and view black and white or pseudo-color video images generated by that camera.

In another aspect of the invention, a power connection is provided between the camcorder and the camera, where that connection is performed through or separately from the interface device. This power connection allows the camera to draw power from a power supply within or electrically connected to the camcorder. In this way, a separate power supply need not be provided for the camera, enhancing the portability and ease of use of the combined camera and camcorder.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
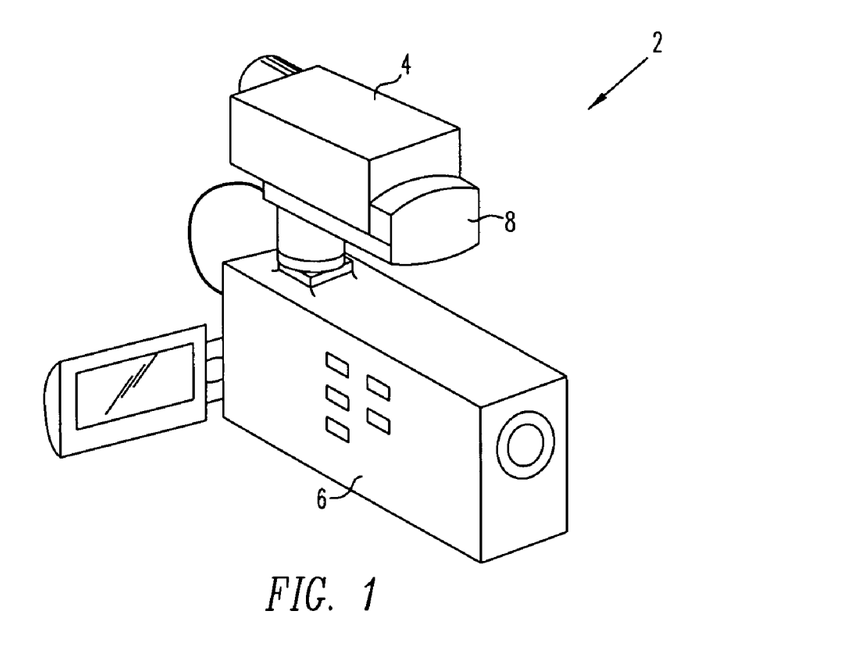
FIG. 1 is a perspective view of a camera connected to a camcorder via an interface device.

Referring to FIG. 1, a portable video imaging system 2 is shown. The portable video imaging system 2 is formed from a camera 4 that captures video images in the non-visible electromagnetic spectrum, a camcorder 6, and an interface device 8 mechanically connecting the camera 4 to the camcorder 6. As used in this document, the term "camcorder" refers to a portable electronic recording device that is capable of capturing and recording live-motion video for later replay. The camera 4 is an Alpha model infrared camera from Indigo Systems of Santa Barbara, Calif., and the camcorder 6 is a model DCR-TRV10 camcorder from Sony Corporation. However, another model of camera 4 adapted to operate in the non-visible electromagnetic spectrum may be used, and/or another model of camcorder 6 may be used. Many models of camcorder 6 are commercially available, and are well known to those skilled in the art.

Referring to FIGS. 2–5, the interface device 8 is shown in greater detail. The interface device 8 is a mechanical interconnect that is coupled to the camera 4 and to the camcorder 6. The interface device 8 includes an upper plate 10 onto which the camera 4 is received. Referring also to FIGS. 6A–6D, the upper plate 10 is shaped to conform substantially to the surface of the camera 4 to be received thereon. Thus, if the lower surface of the camera 4 is substantially flat, the upper plate 10 has a primary surface 11 that correspondingly is substantially flat. The upper plate 10 is also shaped to receive any alignment guides, protrusions, or other mating elements of the camera 4. Two cutouts 12 are formed on opposite lateral sides of the upper plate 10. The cutouts 12 may be shaped to receive corresponding alignment guides on the camera 4, if desired. The cutouts 12 are narrow, and longer than they are wide. Lateral flanges 14 may extend downward from the upper plate 10, adjacent to the inner edge 15 of each cutout 12. The lateral flanges 14 are substantially perpendicular to the upper plate 10. The lateral flanges 14 may be formed from the same piece of material as the upper plate 10, or may be connected to the upper plate 10 after construction of the upper plate 10. The lateral flanges 14 may be substantially rectangular, such that the size and shape of each lateral flange 14 is substantially the same as the size and shape of the adjacent cutout 12. Each lateral flange 14 curves downward and away from the inner edge 15 of the associated cutout 12, into a direction substantially perpendicular to the primary surface 11 of the upper plate 10. The upper plate 10 is constructed of a metallic material, but the upper plate 10 may be constructed of any material appropriate for mechanically interfacing with the camera 4.

The upper plate 10 includes a rear flange 16 extending upward from and substantially perpendicular to the primary surface 11. The rear flange 16 may be formed from the same piece of material as the primary surface 11, such as by bending a portion of it upward, or may be formed separately from and connected to the primary surface 11. The rear flange 16 may act as a backstop to assist in aligning the camera 4 onto the upper plate 10. A cutout 18 extends through the rear flange 16, and a connector 20 extends into that cutout 18. Where the camera 4 includes a corresponding connector on its rear surface, the camera 4 mates with the connector 20 as the camera 4 is received onto the upper plate 10.

The connector 20 may be a 26-pin connector adapted to carry video data and feedback from the camera 4 and to provide control signals and power to the camera 4.

Figure 11A:
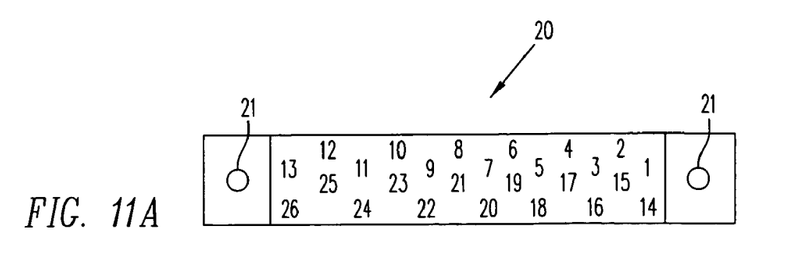
FIGS. 11A–11B are block diagrams of a connector on the interface device and wires associated with it.
Figure 11B:
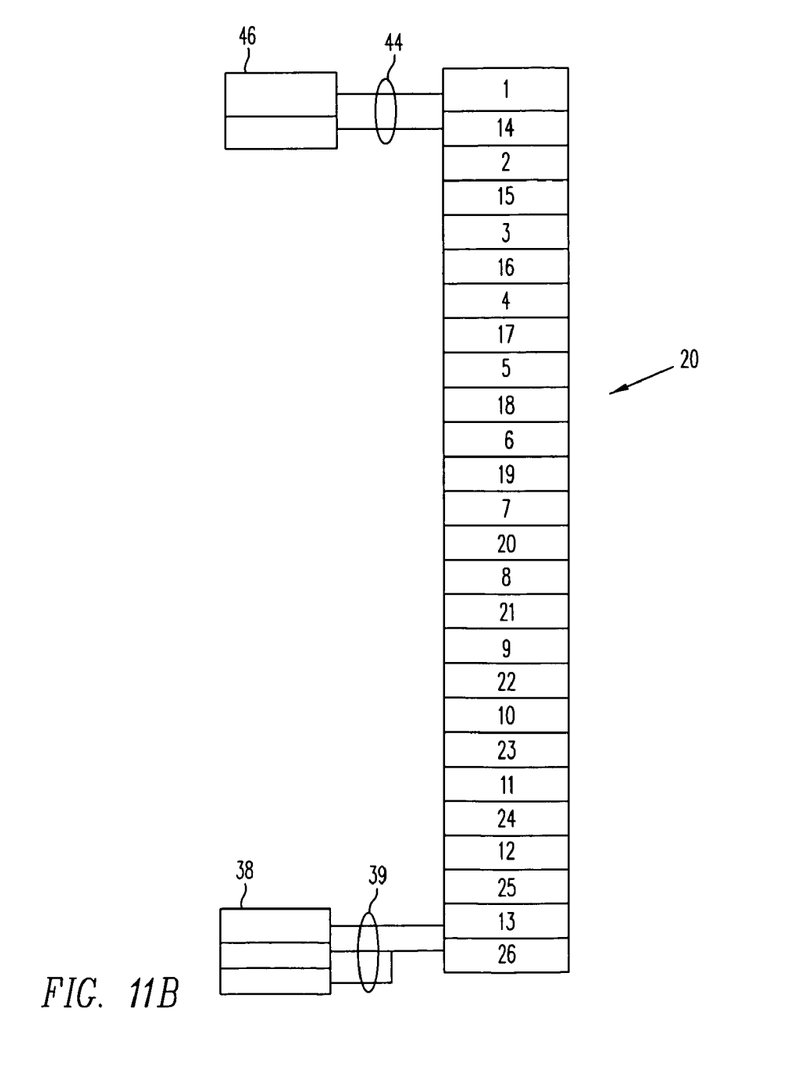

The connector 20 may be male or female, or another type of connector. Referring as well to FIGS. 11A–11B, FIG. 11A is a block diagram of one configuration of the connector 20, and FIG. 11B is a block diagram by pin. Pin 1 of the connector 20 is connected to the coax center conductor of a cable 44, and pin 14 of the connector 20 is connected to the coax shield of the cable 44, which is a coaxial cable. Pin 13 is connected to a wire associated with DC power ground, and pin 26 is connected to a wire on which a DC voltage is applied.

However, the connector 20 may have more or fewer pins, as needed; the particular pin count and configuration of the connector 20 are not critical to the invention. Further, the connector 20 may be solely a data connector or a power connector. For example, the connector 20 may be adapted to transmit data and feedback from the camera 4 and transmit control signals to the camera 4, where power is supplied to the camera 4 by another structure, such as a power cord or an internal battery. As another example, the connector 20 may be an optical connector designed to interface with an optical fiber or other optical transmission medium, such that the connector 20 is used for video and control data, and a separate connector may be utilized to deliver power to the camera 4. As another example, the connector 20 may be adapted to transmit power to the camera 4, where data, feedback and control signals are transmitted to and from the camera 4 by another structure or method, such as via a separate wire or a wireless connection. The connector 20 may be secured to the rear flange 16. This securing may be performed via notches 17 on opposite sides of the cutout 18. The connector 20 may have apertures 21 corresponding to the location of the notches 17, where a fastener 19 extends through each aperture into the corresponding notch 17 to secure the connector 20 to the rear flange 16. Connectors 20 having such apertures 21 are well known in the art.

Referring as well to FIGS. 7A–7F, the upper plate 10 is secured to a baseplate 22 positioned underneath the upper plate 10. The upper plate 10 may be secured to the baseplate 22 through fasteners such as screws or bolts, by adhesives, by welding, or by any other mechanism or method capable of providing a secure connection between them. The baseplate 22 has a bottom surface 24, where the bottom surface 24 is spaced apart from the upper plate 10 to form a space between them.

The bottom surface 24 is separated from the upper plate 10 by a number of posts 26 formed into the baseplate 22. These posts 26 may be cylindrical, or take other forms; the shapes of the posts 26 need not be identical. Each post 26 includes a threaded aperture therethrough. However, the posts 26 need not be threaded. A fastener 27 extends from the upper plate 10 through each post 26, thereby securing the upper plate 10 to the baseplate 22. The fasteners 27 may be screws, bolts or other types of fasteners. The same fasteners 27 may also secure the camera 4 to the baseplate 22, via threaded holes in the base of the camera 4. Further, if devices or methods other than threaded fasteners are used to secure the upper plate 10 to the baseplate 22, then the posts 26 may act merely as spacers, and need not have apertures therethrough for receiving fasteners. For example, if adhesive is used to secure the upper plate 10 to the baseplate 22, then the posts 26 may be solid structures each having an appropriate height for spacing the upper plate 10 from the bottom surface 24 of the baseplate 22, as desired.

An aperture 42 is provided through the bottom surface 24 of the baseplate 22. The aperture 42 is substantially rectangular, with rounded corners. The shape of the aperture 42 and its relationship with other components of the interface device 8 are described in greater detail below. A depression 43 is formed in the bottom surface 24 of the baseplate 22 behind the aperture 42. The size and shape of the aperture 42 and the depression 43 are determined by the size and shape of a mount to received therein, as described below.

Alternately, the upper plate 10 is not utilized. The lower surface of the camera 4 creates the upper surface of a space bounded below by the bottom surface 24 of the baseplate 22. The camera 4 is connected directly to the baseplate 22, rather than through an intermediary upper plate 10.

The connector 20 itself may be secured to the baseplate 22 rather than, or in addition to, the rear flange 16 of the upper plate 10. The connector 20 may be secured to the baseplate 22 via fasteners, adhesives, or other mechanisms or methods.

An outer wall 28 extends upward from the edge of the baseplate 22 substantially completely around the baseplate 22, thereby at least partly enclosing the space between the bottom surface 24 of the baseplate 22 and the upper plate 10. The outer wall 28 need not have a constant height at all locations along the baseplate 22. The outer wall 28 may be omitted from the baseplate 22, if desired. A port 30 is provided in the outer wall 28, at the front of the baseplate 22. A cable 44 may extend from the connector 20 through the space between the bottom surface 24 and the upper plate 10, then exit that space through the port 30. In this way, the cable 44 extends through the interface device 8 before emerging and connecting to the camcorder 6. Optionally, the cable 44 may be secured to the upper plate 10, the baseplate 22, or other structure within the interface device 8, to protect the wire from forces that may act to pull that wire out of the connector 20.

Figure 2:
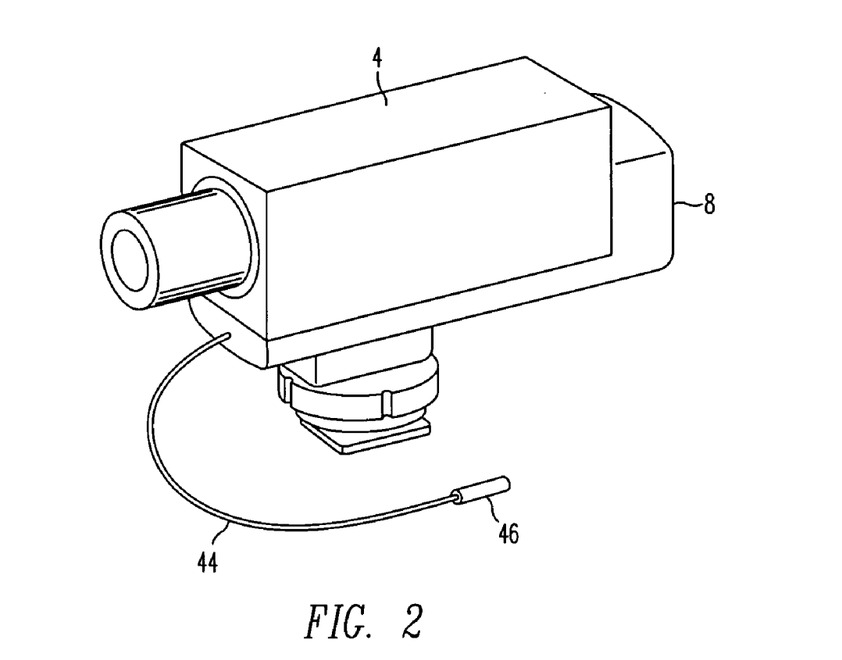
FIG. 2 is a perspective view of the camera connected to the interface device.
Figure 3:
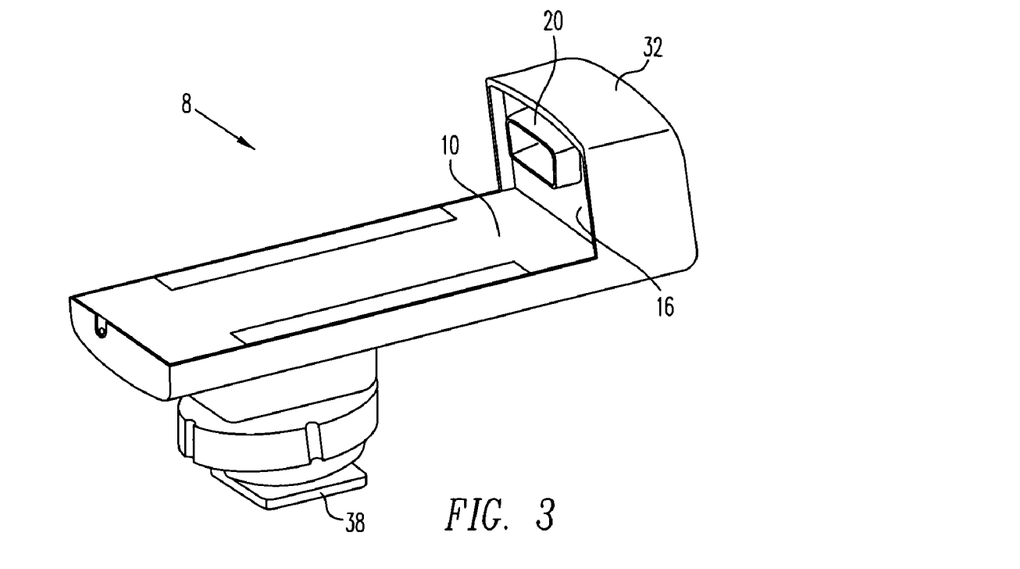
FIG. 3 is a perspective view of an embodiment of the interface device.
Figure 4:
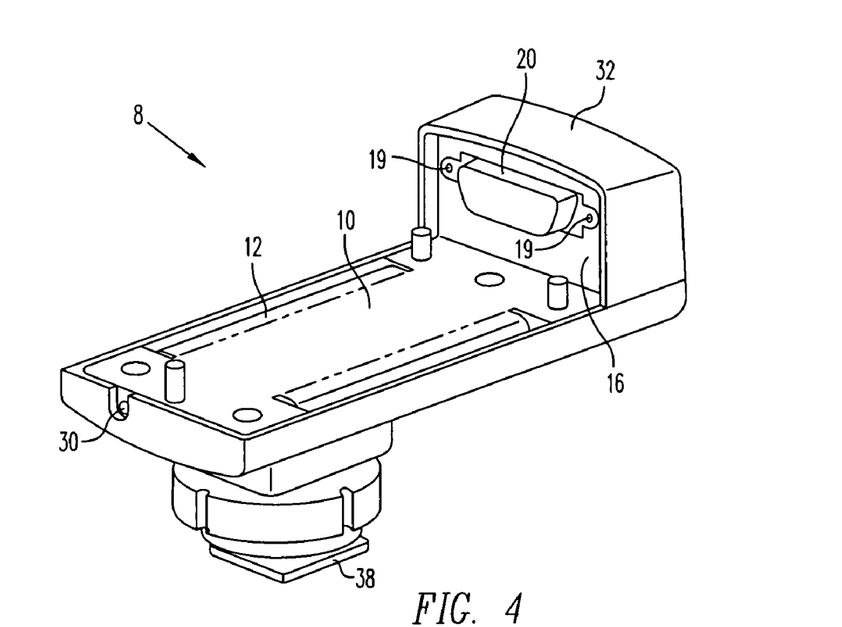
FIG. 4 is a perspective view of an embodiment of the interface device.

Referring as well to FIG. 2, the cable 44 emerges from the port 30 in the baseplate 22. The cable 44 is a video cord that carries video data from the camera 4 to the camcorder 6. Power may be provided to the camera 4 from the camcorder 6 separate from the cable 44 via a hot shoe mount 38, as described below. The video cable 44 extends from the connector 20, through the space between the upper plate 10 and the bottom surface 24 of the baseplate 22, and out through the port 30, terminating in a video connector 46. The video connector 46 connects to a mating connector 66 on the camcorder 6, as described in greater detail below. A curved passageway 48 connects the port 30 to the interior space between the upper plate 10 and the bottom surface 24 of the baseplate 22. The cable 44 passes through this curved passageway 48 to exit the port 30. The curved passageway 48 has a cross-sectional area and shape adapted to hold the cable 44 such that tugs or other stresses on the cable 44 outside the interface device 8 are substantially not transmitted into the interface device 8. The cable 44 may also pass between the outer wall 28 and a post 26 positioned near the curved passageway 48, thereby providing further resistance to stresses exerted upon the cable 44.

Referring as well to FIGS. 8A–8D, a casing 32 may be provided behind the rear flange 16 of the upper plate 10. The casing 32 is a shell that protects the connector 20 and acts to better enclose the interface device 8. The casing 32 extends from the rear flange 16 over the connector 20, then downward around the sides and rear of the connector 20 to connect to the baseplate 22. The casing 32 is made of the same material as the upper plate 10 and/or baseplate 22. However, the particular material from which the casing 32 is constructed is not critical to the invention. The casing 32 may include a notch 52 that is shaped and sized to interface with a portion of the connector 20. The notch 52 extends along a front portion of an upper surface 54 of the casing 32. The notch 52 receives the upper edge of the rear flange 16 of the is upper plate 10 when the upper plate 10 is mated with the casing 32. Thus, a portion of the casing 32 may protrude forward of the rear flange 16 on top of and on both sides of the rear flange 16. This overhang may assist in receiving the camera 4. That is, the upper surface 54 of the casing 32 may be shaped and sized such that the rear of the camera 4 is received under it, such that the casing 32 assists in securing the camera 4 to the interface device 8.

The casing 32 is attached to the baseplate 22 by fasteners such as screws or bolts. One or more casing posts 56 are formed into the casing 32 at or near its base, and an aperture 58 is provided through each casing post 56. Corresponding posts 26 extend upward from the bottom surface 24 of the baseplate 22. The posts 26 may be threaded or non-threaded. A fastener 27 extends through each post and the corresponding aperture of the casing 32, thereby securing the casing 32 to the baseplate 22. The casing 32 may be attached to the baseplate 22 in another manner if desired, such as by adhesive or by latches.

Figure 9:
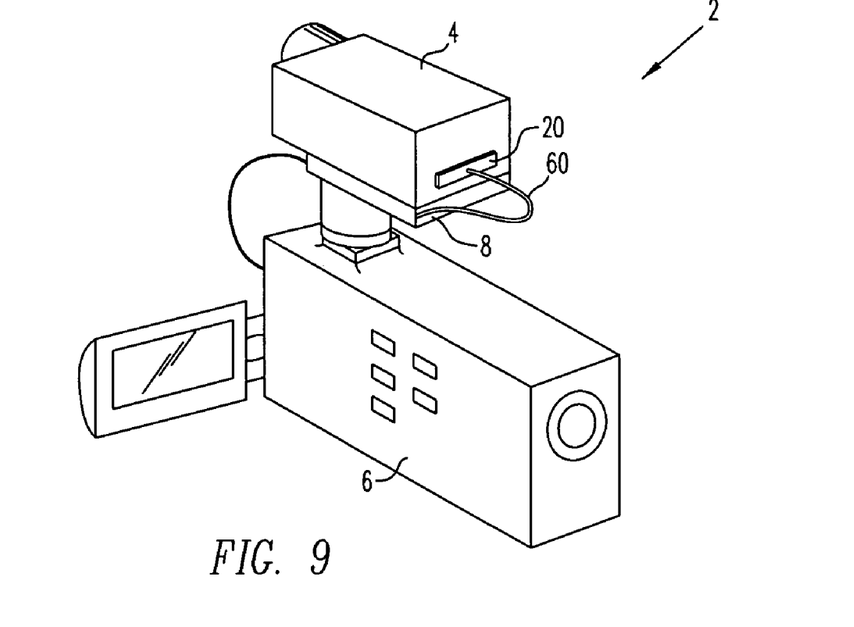
FIG. 9 is a perspective view of a camera connected to a camcorder via another embodiment of an interface device.

Referring to FIG. 9, in another embodiment of the portable video imaging system 2, the casing 32 is not utilized, nor is the rear flange 16. Correspondingly, the baseplate 22 need not extend as far rearward. In such an embodiment, the connector 20 is not supported by or within the interface device 8. Rather, the connector 20 is located at one end of a cable 60, where the cable 60 extends through the interface device 8. The connector 20 mates with a corresponding connector on the camera 4, such that the connector 20 is supported by the camera 4.

Figure 5:
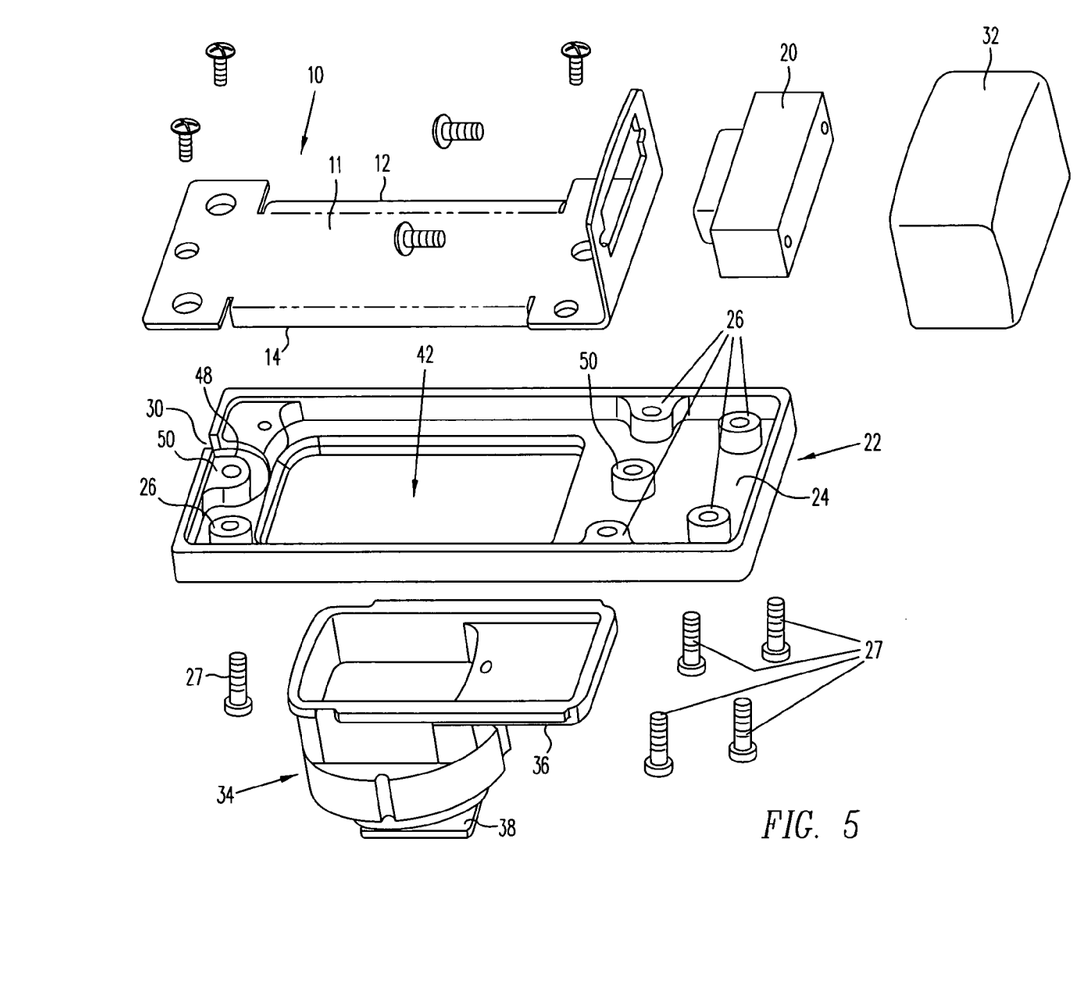
FIG. 5 is an exploded view of an embodiment of the interface device.
Figures 6A, 6B:
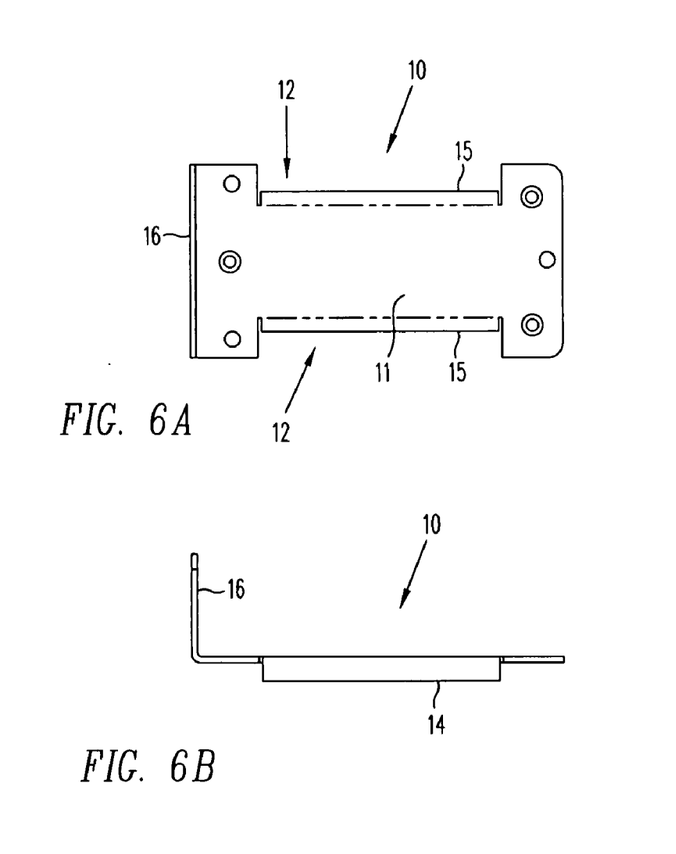
FIGS. 6A–6D are top, side, front and perspective views, respectively, of an upper plate utilized in an embodiment of the interface device.
Figure 6C:
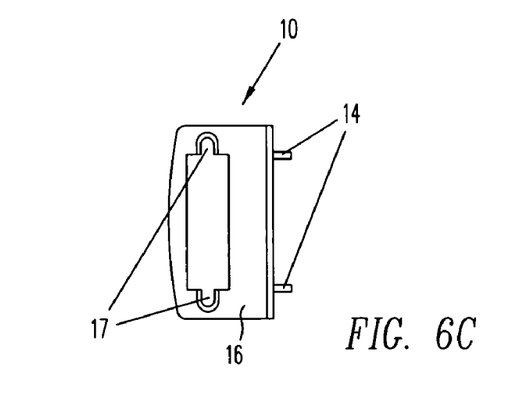
Figure 6D:
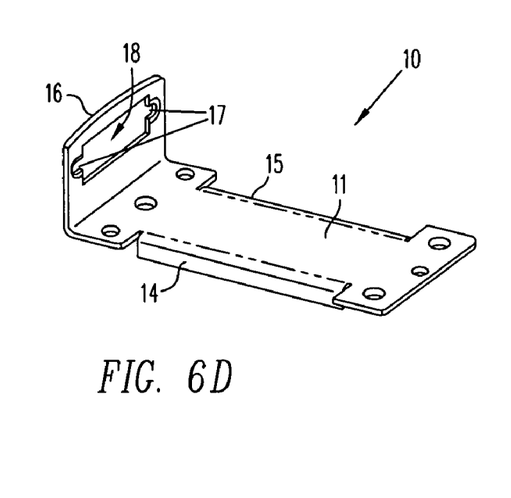
Figure 7A:
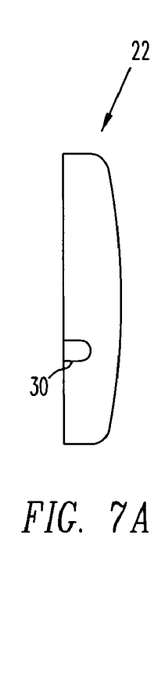
FIGS. 7A–7F are front, top, side cross-section, bottom, front cross-section and perspective views of a baseplate utilized in an embodiment of the interface device.
Figure 7B:
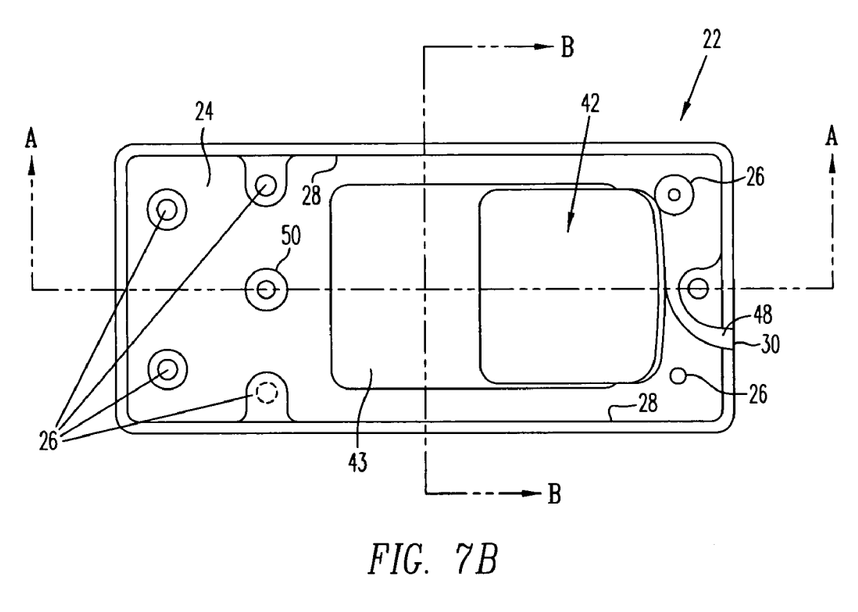
Figure 7C:
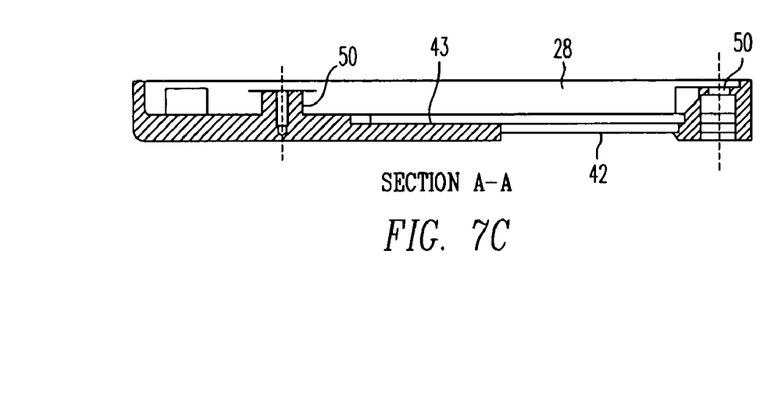
Figure 7D:
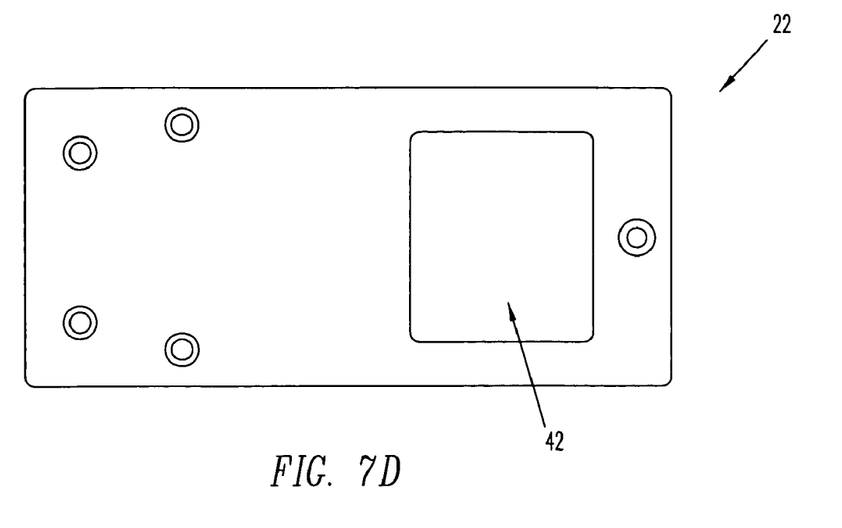
Figure 7E:
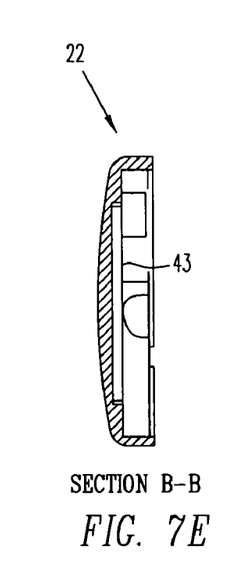
Figure 7F:
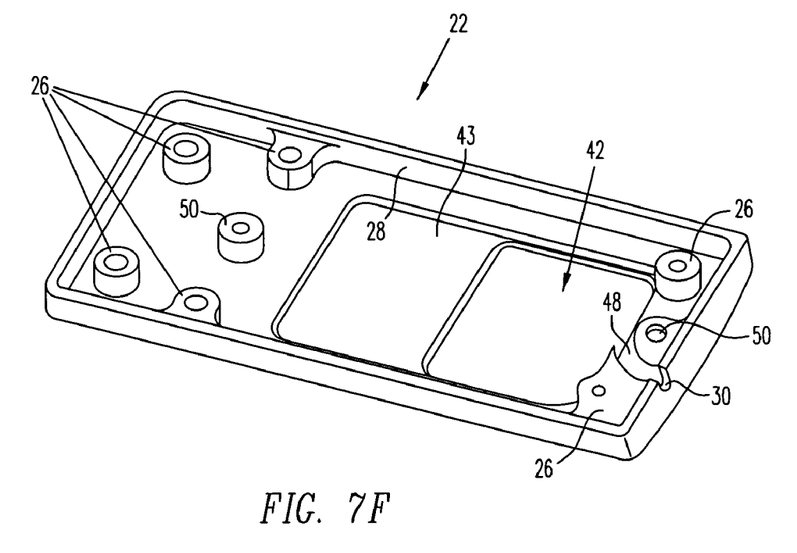
Figures 8A, 8B:
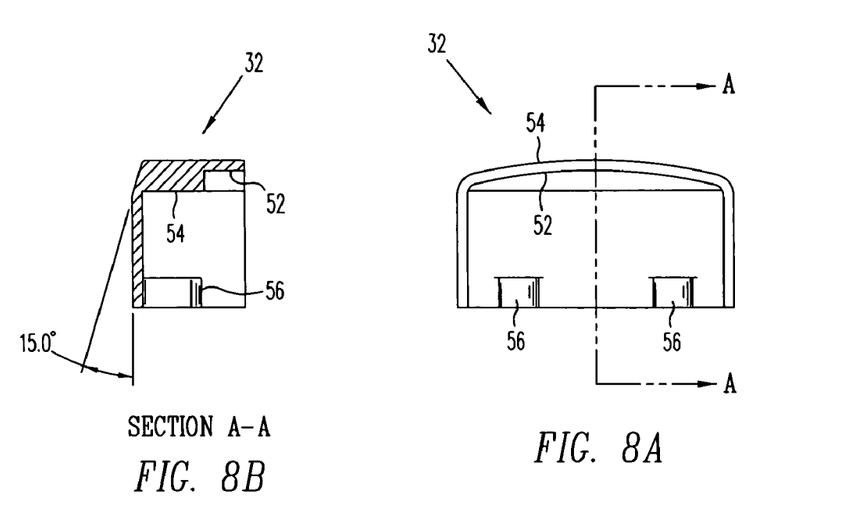
FIGS. 8A–8D are front, bottom, side cross-section and perspective views, respectively, of a casing utilized in an embodiment of the interface device.
Figure 8C:
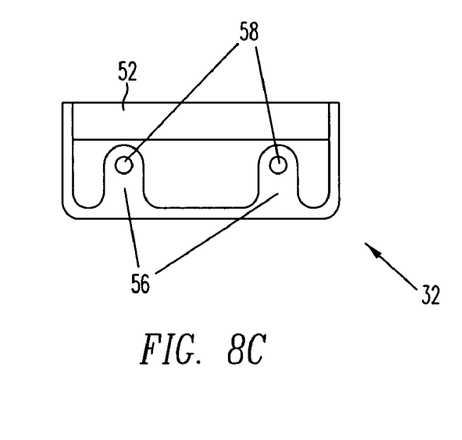
Figure 8D:
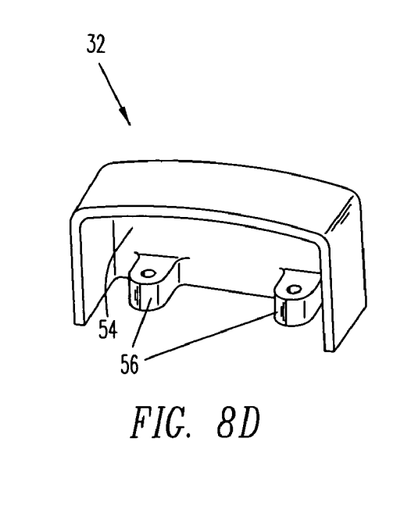

Referring to FIG. 5, a mount 34 includes an upper platform 36 and a hot shoe mount 38. The mount 34 may be removed from the base of a camcorder flash unit sold by the Sony Corporation as the Sony Video Flashlight, having Sony part number HVLFDH3. The upper platform 36 of the mount 34 is compressed between the upper plate 10 and the baseplate 22 to secure the mount 34 to those components. The mount 34 is inserted through the aperture 42 in the bottom surface 24 of the baseplate 22, such that a portion of the upper platform 36 extends beyond the edges of the aperture 42 and engages the depression 43 in the bottom surface 24 of the baseplate 22. The depression 43 engages the rear portion of the upper platform 36, and acts to restrain the upper platform 36 against lateral or backward motion. The front edge of the aperture 42 acts to restrain the upper platform 36 against forward motion. When the upper plate 10 is secured to the baseplate 22, the upper platform 36 of the mount 34 is secured between those components 10, 22. The flanges 14 of the upper plate 10 are adapted to engage the upper platform 36 of the mount 34, and press the upper platform 36 against the bottom surface 24 of the baseplate 22. Alternately, the flanges 14 of the upper plate 10 are adapted to extend adjacent to the lateral sides of the upper platform 36, restraining its lateral motion. Alternately, if the flanges 14 are not used, the underside of the upper plate 10 engages the upper platform 36 of the mount 34. Further, the upper platform 36 of the mount 34 may be secured to the upper plate 10, the baseplate 22 or both by other structures or methods, such as by fasteners, by adhesive, or by welding.

Although the interface device 8 has been described above as having a number of discrete components, two or more of such components may be formed, constructed, or otherwise manufactured as a unitary, integral part, if desired. For example, the mount 34 and the baseplate 22 may be constructed as a single unitary component.

The camera 4 is attached to the interface device 8. The camera 4 is placed upon the upper plate 10 of the interface device 8 and slid backward along the upper plate 10 until a connector (not shown) on the rear of the camera 4 engages the connector 20. The camera 4 is then structurally connected to the interface device 8. The camera 4 may include one or more alignment guides adapted to engage the cutouts 12 in the upper plate 10. One or more threaded holes (not shown) are present on the bottom surface of the camera 4, and corresponding posts 50 having apertures therein extend through the baseplate 22 and the upper plate 10. A threaded fastener is then inserted into each post 50, engaging the corresponding threaded hole in the camera 4, and securing the camera 4 to the interface device 8. However, the camera 4 may be secured to the interface device 8 in another way and/or using different structures or mechanisms. For example, the camera 4 may be attached to the upper plate 10 of the interface device 8 with an adhesive, by welding, by VELCRO® brand fasteners, by latches, or by any other structure or method.

The camera 4 may be permanently mounted to the interface device 8 or detachably mounted to the interface device 8. Detachable mounting may be useful where the user has more than one camera 4 that he or she may wish to use in conjunction with the camcorder 6. If the camera 4 is permanently mounted to the interface device 8, it may be mounted to a separate and discrete interface device 8 with an adhesive, by welding, or in some other manner. The camera 4 instead may be constructed to include an integral interface device 8, or one or more components of the interface device 8. If so, the camera 4 is considered to be permanently mounted to the interface device 8. In such a configuration, where the camera 4 includes one or more components of the interface device 8 within itself or its housing, those components are substantially as described above with regard to the separate and discrete interface device 8.

Figure 10:
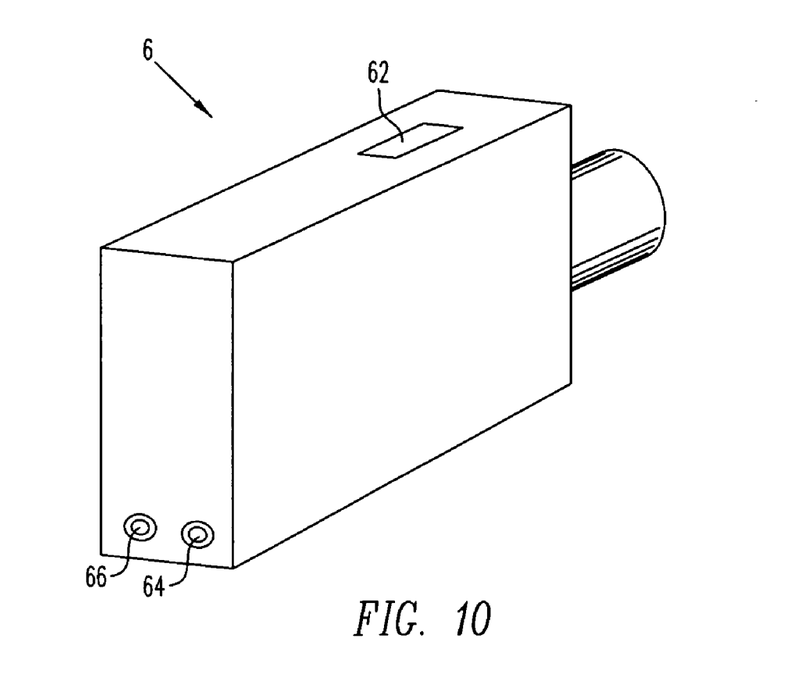
FIG. 10 is a perspective view of a camcorder.

The interface device 8 is attached to the camcorder 6. Referring as well to FIG. 10, a hot shoe 62 is present on an upper surface of the camcorder 6. The term "hot shoe" generally refers to a mechanical feature on a photographic device that allows for the attachment of a stand-alone lighting product. The hot shoe 62 and its use are standard in the photographic industry. The hot shoe mount 38 of the mount 34 is connected mechanically to the hot shoe 62 on the camcorder 6, such that the mount 34 and thereby the interface device 8 is secured to the camcorder. The hot shoe 62 on the camcorder 6 is the Intelligent Accessory Shoe interface present on camcorders manufactured by the Sony Corporation, such as model number DCR-TRV10, and the hot shoe mount 38 is compatible with that Intelligent Accessory Shoe. However, the camcorder 6 instead may include a different type of hot shoe, where the corresponding hot shoe mount 38 is constructed accordingly.

Referring as well to FIGS. 11A–11B, power is provided at the hot shoe 62 on the camcorder 6. The hot shoe mount 38 that is mechanically connected to the hot shoe 62 receives that power. A cord 39 connects the hot shoe mount 38 to the connector 20 in order to provide power to the camera 4. The inner portion of the hot shoe mount 38 includes pins, contacts, receptacles, or other electrical connectors electrically connected to the outer surface of the hot shoe mount 38. In this way, electrical power received at the hot shoe mount 38 is carried into the interface device 8. Similarly, ground at the hot shot 62 is carried through the hot shoe mount 38 into the interface device 8. One pin electrically connected to the inner portion of the hot shoe mount 38 is a ground pin, and another two pins electrically connected to the inner portion of the hot shoe mount 38 are pins associated with the application of voltage and current to the camera 4. The ground pin is electrically connected to the wire in the cord 39 that is connected at its opposite end to the ground pin of the connector 20, such as pin 13. Similarly, the two power pins are electrically connected to the wire in the cord 39 that is connected at its opposite end to the power pin of the connector 20, such as pin 26.

The cord 39 runs within the interface device 8, extending from the hot shoe mount 38 or contacts or connectors thereon, through the aperture 42 in the baseplate 22, through the space between the upper plate 10 and the bottom surface 24 of the baseplate 22, and into the space enclosed by the casing 32 in order to connect to the connector 20. One or more pins on the connector 20 are adapted to provide power to the camera 4, and the cord 39 contains a number of wires connected to those pins. Such pins may include a positive terminal, negative terminal and ground, and the cord contains wires corresponding to those pins. Other structures, or other number of pins, may be used to provide power from the hot shoe 62 to the camera 4. Thus, structures associated with power provisioning are included as a part of the interface device 8. Alternately, a power cord extends from the hot shoe mount 38 out of the interface device 8 to a power port 64 or similar structure on the camera 4. In this way, provision of power to the camera 4 is more flexible. Alternately, power is not provided to the camera 4 via the interface device 8 at all. Rather, a power cord or other structure connects at one end to the power port 64 or other structure on the camcorder 6, where the port is adapted to supply power. At the other end, the power cord connects to a port or other structure on the camera 4, where the port is adapted to receive power. Alternately, the camera 4 may include its own power supply, such as a battery. The power provided at the hot shoe 62 on the camcorder 6 is standard DC power, and the camera 4 is adapted to operate at the voltage and current provided via the hot shoe 62. The interface device 8 instead may include a transformer, voltage converter or other device or circuitry adapted to convert the form of electrical power provided at the hot shoe 62 to a form usable by the camera 4.

The video cable 44 is attached to the connector 20. One or more pins on the connector 20 are adapted to receive video data from the camera 4, and the video cable 44 may contain a separate wire corresponding to each such pin. One end of the video cable 44 terminates in the video connector 46, which has a single pin adapted for insertion into a mating connector 66 on the camcorder 6. The single pin is connected to the coaxial center conductor of the cable 44. The coax shield of the cable 44 is also connected to the pin, where the pin has separate regions thereon, one associated with the coax shield and one with the video signal. In this way, the shielding extends into the video connector 66 to minimize RF interference. The video connector 46 may have one or more pins, receptacles or other interface structures that are adapted to mate with a corresponding video connector 66 on the camcorder 6. The video cable 44 need not extend through the interface device 8, and may instead directly connects a video connector on the camera 4 with the video connector 66 on the camcorder 6. The video connector 66 may be the VIDEO IN connector that is standard on virtually all commercially-available models of camcorder 6. The camera 4 generates video data in standard RS-170A or NTSC video formats, where that video data is transmitted over the video cable 44. However, the video data carried over the video cable 44 may be in PAL, HDTV, or another format. The format and structure of the video data carried over the video cable 44 is not critical to the invention. Video data is received in the camcorder 6 and recorded on storage media within or otherwise associated with the camcorder 6. That is, the video connector 66 is connected to circuitry within the camcorder 6 adapted to write that data to storage media. Such storage media may be videotape in VHS, VHS-C, 8 mm, Hi8, DV, Beta, U-Matic, or other sizes or formats, a hard drive, a removable cartridge drive, or any other type of storage media capable of storing video data. Further, video data may be transmitted to a display on the camcorder 6. The use of a display on a camcorder 6 is standard. By transmitting the video data to a display visible to a user, the user can better control the camera 4 and ensure that he or she is photographing the desired subject in a desired way.

Control signals are carried on the video cable 44. These control signals are transmitted from the camcorder 6 to the camera 4 to control one or more controllable functions of the camera 4. Such control signals may include power control, focusing control, zoom control and/or aperture control. For example, a user may turn on the camcorder 6, and a control signal may then be sent to the camera 4 that activates the camera 4 as well. As another example, the user may zoom in on an object by using the zoom controls on the camcorder 6. Those zoom controls transmit control signals to the camera 4, changing its zoom settings. Alternately, the control signals are carried on separate wires or fibers from video data. Thus, control signals and video data may be carried on separate wires in the same cable, or multiplexed over the same wire or fiber. One or more pins on the connector 20 are adapted to receive control signals from the camcorder 6. Alternately, a separate cable (not shown) is utilized to carry control signals from the camcorder 6 to the camera 4. The control signal cable may follow the same path as the video cable 44, or may be separated from the video cable 44. A separate connector may be provided on the camcorder 6 and on the camera 4 for connection to such a control signal cable, such that control signals can be carried independent from video data. As with the video cable 44, the control signal cable may extend through the interior of the interface device 8, or may connect directly the camera 4 and camcorder 6 without passing through the interface device 8.

Some models of camcorder 6 may have a hot shoe 62 that includes a connector adapted to transmit and receive control information. In such camcorders 6, the separate control cable is restricted within the interface device 8, extending from the hot shoe mount 38 through the aperture 42 in the baseplate 22, through the space between the upper plate 10 and the bottom surface 24 of the baseplate 22, and into the space enclosed by the casing 32 in order to connect to the connector 20. One or more pins on the connector 20 are adapted to receive and/or transmit control information, and the control cable contains a number of wires connected to those pins. Alternately, signals from different pins are multiplexed together and carried along a single wire or fiber. Other structures, or other number of pins, may be used to transmit control information between the camera 4 and the hot shoe 62. Alternately, where the control cable transmits control information between the camera 4 and the hot shoe 62, video data may be combined with the control information on the control cable, and the separate video cable 44 may be omitted.

The camera 4 acts as an accessory to the camcorder 6. Power is applied to the camera 4 when power is applied to the camcorder 6. The normal structure and function of the camcorder 6 are not modified. To record video data from the camera 4, the user switches the camcorder 6 to record mode, which is a standard operating mode. In record mode, the camcorder 6 accepts video data through its video connector 66, and directs that video data to a display and to circuitry adapted to write that video data onto recording media. Record and playback functions of the camcorder 6 operate normally.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. An interface device for connecting a camera that captures video images in the non-visible electromagnetic spectrum to a camcorder, the camcorder having a hot shoe, the camera having a connector, comprising:
   a mechanical interconnect adapted to couple the camera to the camcorder and further adapted to provide power to the camera via the hot shoe, wherein a portable video imaging system is formed and wherein the mechanical interconnect comprises:
   a baseplate having a bottom surface to which the camera is secured;
   an upper plate connected to and spaced apart from said bottom surface of said baseplate, wherein said upper plate comprises a rear flange extending substantially upward therefrom and having a cutout therethrough; and
   a mount extending from said baseplate, said mount connectable to the hot shoe.

2. The interface device of claim 1, further comprising a first connector attached to said rear flange, said first connector connectable to the connector on the camera.

3. The interface device of claim 2, further comprising a casing attached to said baseplate, said casing partially enclosing said first connector.

4. The interface device of claim 1, further comprising a video cable extending between the camera and the camcorder.

5. The interface device of claim 4, wherein said baseplate further comprises:
   an outer wall;
   an aperture in said outer wall; and
   a curved passageway adjacent said aperture;
   wherein said video cable extends through the space between the camera and said baseplate, through said curved passageway and through said aperture in said outer wall.

6. The interface device of claim 1, wherein
   said mount further comprises an upper platform,
   said baseplate further comprises an aperture therethrough, and
   said mount extends through said aperture to position said upper platform between said bottom surface of said baseplate and said upper plate, said upper platform trapped therebetween to secure said mount to said baseplate.

7. The interface device of claim 1, further comprising a plurality of posts extending upward from said bottom surface.

8. The interface device of claim 7, wherein each said post comprises an aperture therethrough and the camera includes apertures corresponding to said apertures in said posts, further comprising a plurality of fasteners, each fastener extending through one aperture and into the camera, whereby the camera is secured to said baseplate.

9. The interface device of claim 7, wherein each said post comprises an aperture therethrough, and said upper plate comprises apertures corresponding to said apertures in said posts, the interface device further comprising a plurality of fasteners, each fastener extending through one aperture of the post and into the camera.

10. The interface device of claim 1, further comprising a power connection between said mount and the camera.

11. The interface device of claim 10, wherein said power connection comprises a wire contained entirely within the interface device.

12. The interface device of claim 1, further comprising a control cable extending between the camera and the camcorder.

13. The interface device of claim 12, wherein said control cable is contained entirely within the interface device.

14. The interface device of claim 1, wherein at least a portion of said mechanical interconnect is integral to the camera.

15. An interface device for connecting a camera that captures video images in the non-visible electromagnetic spectrum to a camcorder, the camcorder having a hot shoe, the camera having a connector, comprising:
   a mount comprising a hot shoe mount connectable to the hot shoe;
   a baseplate secured to said mount, said baseplate comprising
      a bottom surface,
      an outer wall, and
      an aperture in said outer wall;
   an upper plate connected to and spaced apart from said bottom surface of said baseplate, said upper plate comprising a rear flange extending therefrom, said rear flange comprising a cutout therethrough, wherein said camera is secured to said upper plate;
   a first connector attached to said rear flange, said first connector connectable to the connector on the camera;
   a video cable extending from said first connector attached to said rear flange through the space between said upper plate and said bottom surface of said baseplate, and through said aperture in said outer wall; and
   a power cable connecting said hot shoe mount to said first connector attached to said rear flange.

16. A system for recording video images comprising:
   a camera that captures the video images in the non-visible electromagnetic spectrum;
   a camcorder having a hot shoe and adapted to capture video images in the visible electromagnetic spectrum; and
   an interface device that mechanically and electrically connects said camera to said camcorder such that the camcorder selectively records the video images in the non-visible electromagnetic spectrum from the camera or the video images in the visible electromagnetic spectrum of the camcorder, with power provided from the camcorder to the camera via the hot shoe.

17. The system of claim 16, wherein said camera captures video images in the infrared portion of the electromagnetic spectrum.

18. The system of claim 16, wherein said interface device further comprises a power connection between said camera and said camcorder to provide additional power from the camcorder to the camera.

19. The system of claim 16, wherein said interface device further comprises a video data connection between said camera and said camcorder routed through the interface device.

20. The system of claim 16, wherein said interface device further comprises a control signal connection between said camera and said camcorder.

21. The system of claim 16, wherein the interface device further comprises:
   a hot shoe mount adapted to couple to the hot shoe; and
   an interface plate coupled to the hot shoe mount and adapted to securely connect to the camera.

* * * * *